United States Patent
Kimoto

(10) Patent No.: US 9,505,433 B2
(45) Date of Patent: Nov. 29, 2016

(54) POWER STEERING APPARATUS AND BACKLASH ADJUSTMENT MECHANISM THEREFOR

(71) Applicant: HITACHI AUTOMOTIVE SYSTEMS STEERING, LTD., Hiki-gun, Saitama (JP)

(72) Inventor: Susumu Kimoto, Atsugi (JP)

(73) Assignee: HITACHI AUTOMOTIVE SYSTEMS STEERING, LTD., Saitama (JP)

( * ) Notice: Subject to any disclaimer, the term of this patent is extended or adjusted under 35 U.S.C. 154(b) by 0 days.

(21) Appl. No.: 14/645,721

(22) Filed: Mar. 12, 2015

(65) Prior Publication Data

US 2016/0068184 A1 Mar. 10, 2016

(30) Foreign Application Priority Data

Sep. 9, 2014 (JP) ................................. 2014-182821

(51) Int. Cl.
  *B62D 7/22* (2006.01)
  *B62D 5/04* (2006.01)
  *F16H 55/24* (2006.01)

(52) U.S. Cl.
  CPC ............. *B62D 7/226* (2013.01); *B62D 5/0409* (2013.01); *B62D 5/0424* (2013.01); *B62D 5/0454* (2013.01); *F16H 55/24* (2013.01)

(58) Field of Classification Search
  CPC ...... B62D 7/226; B62D 5/0454; F16H 55/24
  USPC ....................................................... 180/444
  See application file for complete search history.

(56) References Cited

U.S. PATENT DOCUMENTS

| 5,213,173 | A  * | 5/1993 | Konishi | B62D 5/0409 180/444 |
| 6,364,049 | B1 * | 4/2002 | Iwasaki | B62D 5/0409 180/444 |
| 6,527,642 | B1 * | 3/2003 | Arai | B62D 5/0409 180/444 |
| 6,708,796 | B2 * | 3/2004 | Kinme | B62D 5/0409 180/444 |
| 6,761,244 | B2 * | 7/2004 | Sano | B62D 5/0409 180/444 |
| 6,900,564 | B2 * | 5/2005 | Kobayashi | B62D 5/0409 180/444 |
| 7,360,467 | B2 * | 4/2008 | Segawa | B62D 5/0409 180/444 |
| 8,813,904 | B2 * | 8/2014 | Hamakita | B62D 5/0403 180/444 |
| 8,833,507 | B2 * | 9/2014 | Sekikawa | B62D 5/0409 180/443 |

(Continued)

FOREIGN PATENT DOCUMENTS

JP 2004-345444 A 12/2004

*Primary Examiner* — Anne Marie Boehler
*Assistant Examiner* — Michael Stabley
(74) *Attorney, Agent, or Firm* — Foley & Lardner LLP

(57) ABSTRACT

A power steering apparatus includes a worm gear that transmits a rotational force of an electric motor to a steering mechanism through engagement of a worm shaft and a worm wheel and a backlash adjustment mechanism that reduces backlash between the worm shaft and the worm wheel. The backlash adjustment mechanism has a ball bearing mounted to the worm shaft, a slider movable in a movement direction substantially perpendicular to a rotation axis of the worm shaft, a first sliding surface provided on an outer circumferential side of an outer race of the ball bearing, and a second sliding surface provided on the slider and brought in sliding contact with the first sliding surface such that forward movement of the slider in the movement direction causes relative sliding of the first and second sliding surfaces to bring the worm shaft closer to the worm wheel.

19 Claims, 10 Drawing Sheets

(56) References Cited

U.S. PATENT DOCUMENTS

| | | | |
|---|---|---|---|
| 9,010,483 B2 * | 4/2015 | Kimoto | B62D 5/0424 180/444 |
| 2007/0062754 A1 * | 3/2007 | Kim | B62D 5/0409 180/444 |
| 2010/0116582 A1 * | 5/2010 | Rho | B62D 5/0409 180/444 |
| 2012/0217085 A1 * | 8/2012 | Sekikawa | B62D 5/0409 180/444 |
| 2013/0075189 A1 * | 3/2013 | Sekikawa | B62D 5/0409 180/444 |
| 2013/0133974 A1 * | 5/2013 | Hamakita | B62D 5/0403 180/444 |
| 2014/0174843 A1 * | 6/2014 | Kimoto | B62D 5/0424 180/444 |

* cited by examiner

POWER STEERING APPARATUS AND BACKLASH ADJUSTMENT MECHANISM THEREFOR

BACKGROUND OF THE INVENTION

The present invention relates to a power steering apparatus and, more particularly, to a backlash adjustment mechanism arranged in the power steering apparatus to reduce backlash in a worm gear.

Japanese Laid-Open Patent Publication No. 2004-345444 discloses a conventional type of power steering apparatus that includes a steering mechanism for transmitting a driver's steering force to steerable wheels, an electric motor for applying a torque as a steering assist force and a worm gear for transmitting the torque of the electric motor to the steering mechanism. The worm gear has, in a gear housing, a worm shaft rotatably mounted on a ball bearing and a worm wheel engaged with the worm shaft so as to reduce the motor torque and transmit the reduced motor torque to the steering mechanism.

This power steering apparatus further includes an annular elastic body disposed on the worm gear as a backlash adjustment mechanism. The annular elastic body is held in a deformed state between the gear housing and the ball bearing and exerts an elastic force (restoring force) on the worm shaft in accordance with the amount of deformation thereof so as to bias the worm shaft toward the worm wheel, bring gear teeth of the worm shaft into engagement with gear teeth of the worm wheel and thereby reduce backlash between the gear teeth of the worm shaft and the gear teeth of the worm wheel.

SUMMARY OF THE INVENTION

Herein, there is a possibility that the gear teeth of the worm wheel will wear during use. The above conventional power steering apparatus allows, when the distance between the gear teeth of the worm wheel and the worm shaft increases with wearing of the gear teeth of the worm wheel, the annular elastic body to move the worm shaft in a direction that deepens the engagement of the gear teeth of the worm shaft with the gear teeth of the worm wheel and reduces the backlash between the gear teeth of the worm shaft and the gear teeth of the worm wheel. By such movement, however, the annular elastic body returns close to its original shape so that the elastic force of the annular elastic body decreases with the amount of deformation. The annular elastic body may thus become unable to maintain its sufficient biasing force against the worm shaft and, when the wearing of the gear teeth of the worm wheel further proceeds, fail to adequately reduce the backlash between the gear teeth of the worm shaft and the gear teeth of the worm wheel. This leads to deterioration of gear transmission performance, occurrence of noise by gear teeth collision (called "gear teeth hitting noise") and the like.

The present invention has been made in view of the foregoing problems. It is an object of the present invention to provide a power steering apparatus, which has a backlash adjustment mechanism capable of reducing backlash between a worm shaft and a worm wheel even in a state that wearing of the worm wheel proceeds to a certain degree. It is also an object of the present invention to provide a backlash adjustment mechanism for the power steering apparatus.

According to one aspect of the present invention, there is provided a power steering apparatus, comprising: a steering mechanism that has a steering shaft connected to a steering wheel and transmits a steering force of the steering wheel to steerable wheels; an electric motor that applies a rotational force as a steering assist force to the steering mechanism; a reduction gear mechanism arranged between the steering mechanism and the electric motor and including: a worm gear that has a worm shaft coupled at one end portion thereof to the electric motor and a worm wheel engaged with the worm shaft and coupled to the steering mechanism and transmits the rotational force of the electric motor to the steering mechanism; and a gear housing that has a shaft accommodation part in which the worm shaft is accommodated and a wheel accommodation part in which the worm wheel is accommodated: a ball bearing mounted to the other end portion of the worm shaft within the shaft accommodation part of the gear housing and having an inner race, an outer race and a plurality of balls to rotatably support the worm shaft; a slider movable in a movement direction substantially perpendicular to a rotation axis of the worm shaft; a first sliding surface provided on an outer circumferential side of the outer race of the ball bearing; and a second sliding surface provided on the slider in an inclined shape with respect to the movement direction of the slider and brought in sliding contact with the first sliding surface such that forward movement of the slider in the movement direction causes relative sliding of the first and second sliding surfaces to bias the worm shaft in an engagement direction that brings the rotation axis of the worm shaft closer to a rotation axis of the worm wheel.

According to another aspect of the present invention, there is provided a backlash adjustment mechanism for a power steering apparatus, the power steering apparatus comprising: a steering mechanism that transmits a steering force of a steering wheel to steerable wheels; an electric motor that applies a rotational force as a steering assist force to the steering mechanism; and a worm gear that has a worm shaft and a worm wheel accommodated in a gear housing and transmits the rotational force of the electric motor to the steering mechanism, the backlash adjustment mechanism being adapted to reduce backlash between the worm shaft and the worm wheel and comprising: a ball bearing having an inner race, an outer race and a plurality of balls to rotatably support the worm shaft; a holder member arranged in the gear housing and having a bearing accommodation part in which the ball bearing is accommodated; a slider movable in a movement direction substantially perpendicular to a rotation axis of the worm shaft; a first sliding surface provided on an outer circumferential side of the holder member; and a second sliding surface provided on the slider in an inclined shape with respect to the movement direction of the slider and brought in sliding contact with the first sliding surface such that forward movement of the slider in the movement direction causes relative sliding of the first and second sliding surfaces to bias the worm shaft in an engagement direction that brings the rotation axis of the worm shaft closer to a rotation axis of the worm wheel.

In the present invention, the backlash between the worm shaft and the worm wheel can be reduced adequately even in a state that wearing of the worm wheel proceeds to a certain degree. It is therefore possible to prevent deterioration of gear transmission performance, occurrence of gear teeth hitting noise and the like over a long period of time.

The other objects and features of the present invention will also become understood from the following description.

DESCRIPTIONS OF THE EMBODIMENTS

Hereinafter, the present invention will be described below with reference to the drawings. The following embodiments each refers to a rack-and-pinion type electric power steering apparatus equipped with a backlash adjustment mechanism in a vehicle.

[First Embodiment]

Figure 1:
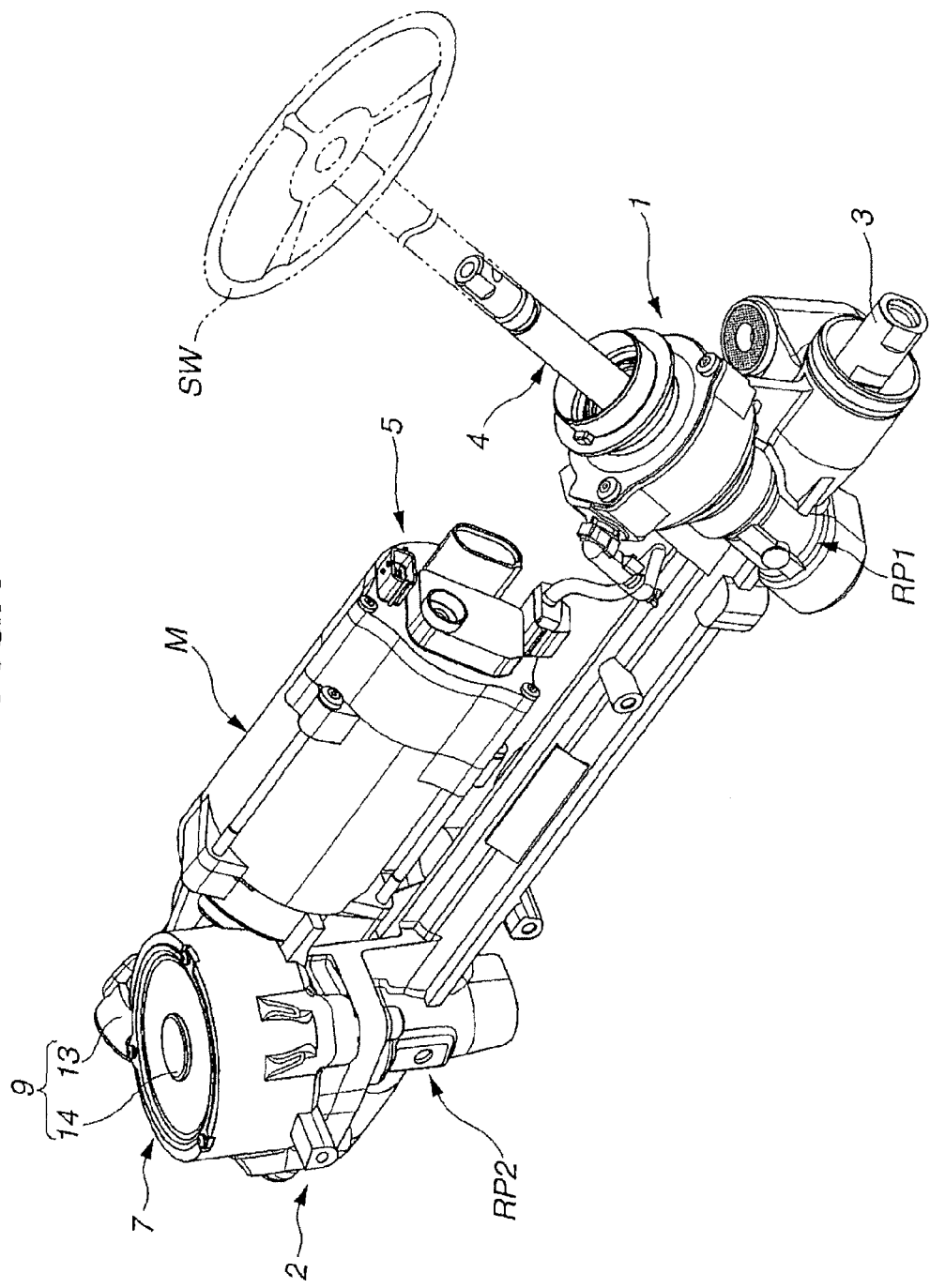
FIG. 1 is a perspective view of a power steering apparatus equipped with a backlash adjustment mechanism according to a first embodiment of the present invention.

As shown in FIG. 1, the power steering apparatus is designed as a so-called dual pinion type electric power steering apparatus, including a steering mechanism with a rack-and-pinion steering system 1 and a rack-and-pinion steering assist system 2. The rack-and-pinion steering system 1 is connected to a steering wheel SW and adapted to transmit a driver's steering force from the steering wheel SW to steerable vehicle wheels (not shown). The rack-and-pinion steering assist system 2 is connected to an electric motor M and adapted to transmit a rotational force of the electric motor M as a steering assist force to the steerable vehicle wheels. Both of the rack-and-pinion steering system 1 and the rack-and-pinion steering assist system 2 are disposed on a common rack bar 3. Although not specifically shown in the drawings, both end portions of the rack bar 3 are connected to the steerable vehicle wheels through tie rods and knuckle anus, respectively. The power steering apparatus also includes an electric control unit (ECU) 5 arranged adjacent to the electric motor M and a reduction gear mechanism 7 arranged between the electric motor M and the steering assist system 2.

The rack-and-pinion steering system 1 is provided with a steering shaft 4 and a first rack-and-pinion unit RP1 as shown in FIG. 1. The steering shaft 4 has an input shaft member coupled at one end thereof to the steering wheel SW and an output shaft member relatively rotatably coupled to the other end of the input shaft member via a torsion bar. The first rack-and-pinion unit RP1 coverts rotation of the steering shaft 4 (output shaft member) to linear axial movement of the rack bar 3 for steering of the steerable vehicle wheels. According to the rotation direction of the steering shaft 4, the rack bar 3 are axially moved by the rack-and-pinion steering system 1 to change the orientation of the steerable vehicle wheels through the tie rods and the knuckle arms.

A torque sensor TS is disposed in the rack-and-pinion unit RP1 to detect the steering torque based on the amount of relative rotational displacement between the input and output shaft members of the steering shaft 4 and output the detection result as a steering torque signal to the ECU 5.

Further, a vehicle speed sensor is disposed adjacent to the vehicle road wheel to detect a running speed of the vehicle and output the detection result as a vehicle speed signal to the ECU 5 although not specifically shown in the drawings.

The ECU 5 serves as a processing unit to perform drive control of the electric motor M based on the output signals from the torque sensor TS, the vehicle speed sensor and the like.

Figure 2:
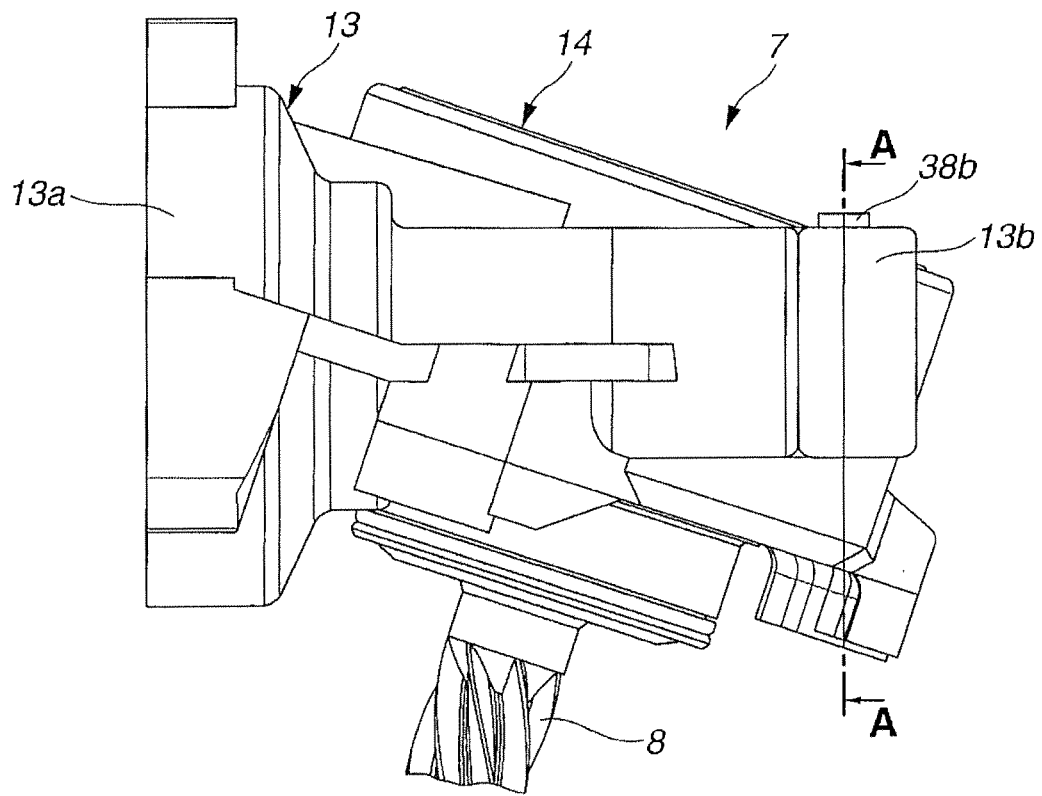
FIG. 2 is a side view of a reduction gear mechanism of the power steering apparatus, as viewed from the side of a worm shaft accommodation part, according to the first embodiment of the present invention.

The rack-and-pinion steering assist system 2 is provided with an output shaft 8 and a second rack-and-pinion unit RP2 as shown in FIGS. 1 and 2. The output shaft 8 is connected to the electric motor M via the reduction gear mechanism 7. The second rack-and-pinion unit RP2 converts rotation of the output shaft 8 to linear axial movement of the rack bar 3 for steering of the steerable vehicle wheels.

Figure 3:
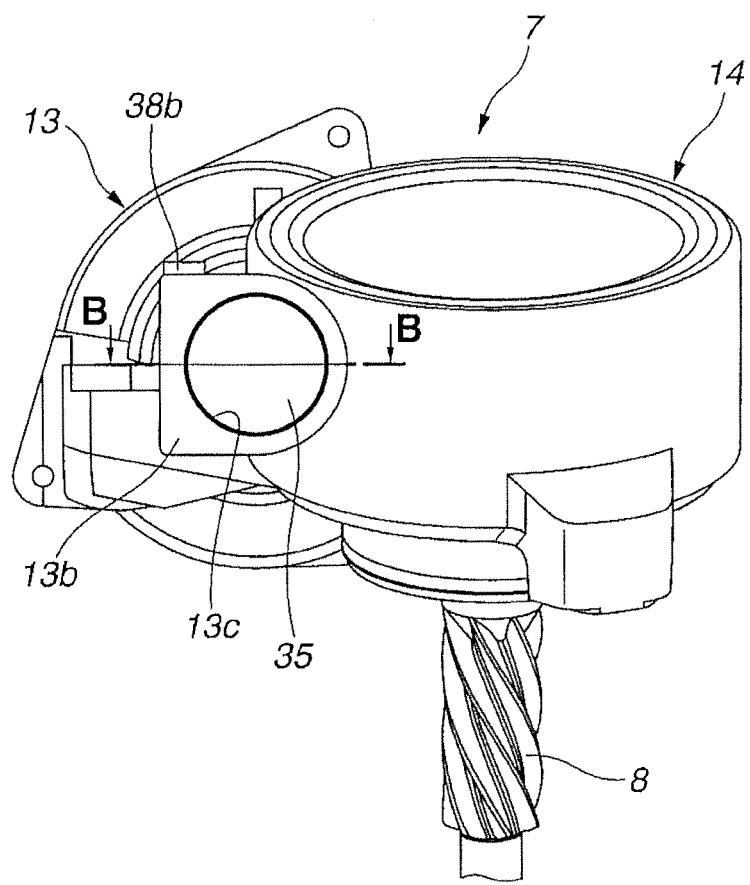
FIG. 3 is a front view of the reduction gear mechanism of the power steering apparatus, as viewed from the side of a worm wheel accommodation part, according to the first embodiment of the present invention.

As shown in FIGS. 1 to 3, the reduction gear mechanism 7 includes a gear housing 9 disposed on an upper side of the second rack-and-pinion unit RP2 and a worm gear 10 accommodated in the gear housing 9.

Figure 6:
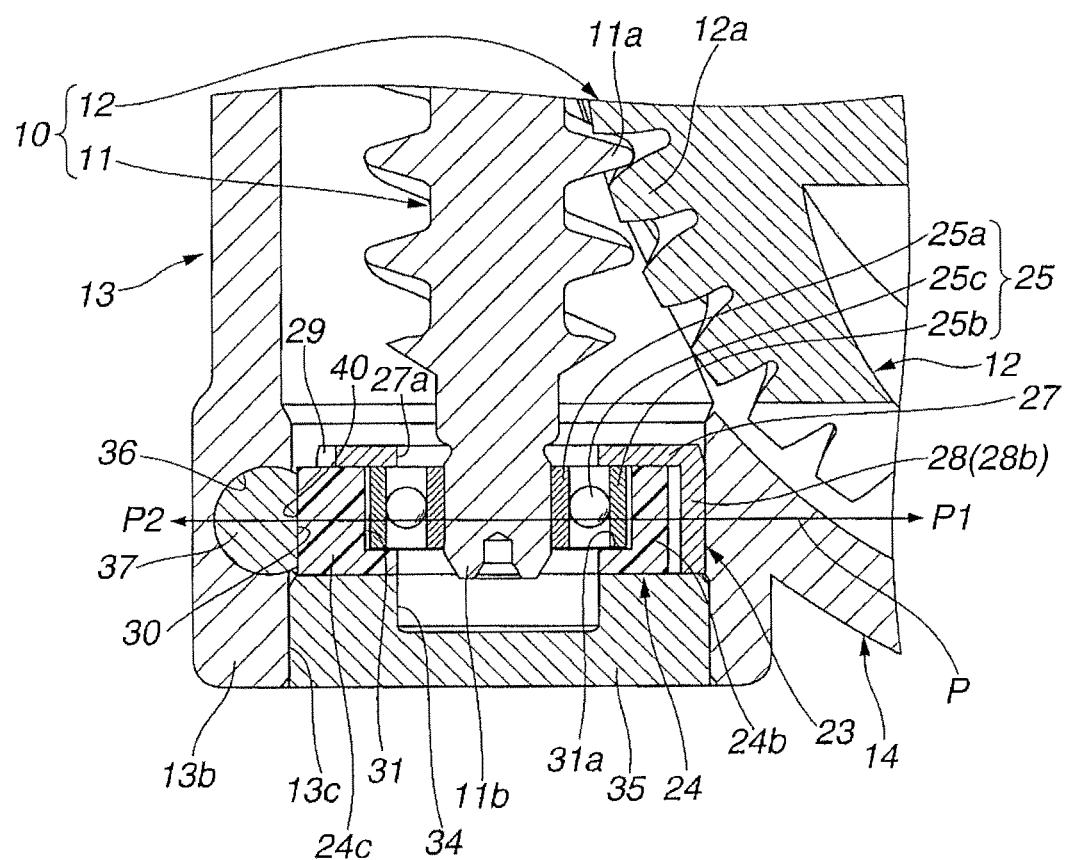
FIG. 6 is a section view taken along line B-B of FIG. 3.

The worm gear 10 has a worm shaft 11 and a worm wheel 12 as shown in FIG. 6. The worm shaft 11 is made of a metal material and coupled at one end thereof to a drive shaft of the electric motor M so as to receive the rotational force of the electric motor M. Gear teeth 11a are formed on an outer circumference of the worm shaft 11. The worm wheel 12 is made of a synthetic resin material and coupled to the outer circumference of the output shaft 8 so as to rotate together with the output shaft 8. Gear teeth 12a are formed on an outer circumference of the worm wheel 12. The gear teeth 11a of the worm shaft 11 and the gear teeth 12 of the worm shaft 12 are engaged with each other in a torsional relationship.

Thus, the rotational force of the electric motor M (i.e., high-rotation low-torque steering assist force) is reduced to an adequate steering assist level by the worm gear 10 and the second rack-and-pinion unit RP2, and then, transmitted from the output shaft 8 to the steerable vehicle wheels.

The gear housing 9 has a cylindrical shaft accommodation part 13 arranged on an axis of the drive shaft of the electric motor M and accommodating therein the worm shaft 11 and a large-diameter cylindrical wheel accommodating part 14 arranged perpendicular to the shaft accommodation part 13 and accommodating therein the worm wheel 12 as shown in FIGS. 1 to 3. These accommodation parts 13 and 14 are in communication with each other such that the worm shaft 11 and the worm wheel 12 are in engagement with each other through the communication part between the accommodation parts 13 and 14.

As shown in FIGS. 3 to 6, the backlash adjustment mechanism is mounted on an end portion 13b of the shaft accommodation part 13 (axially opposite from an motor-side end portion 13a of the shaft accommodation part 13) and adapted to bias the worm shaft 11 against the worm wheel 12, bring the gear teeth 11a of the worm shaft 11 closer to the gear teeth 12a of the worm wheel 12 and thereby adjust backlash between the gear teeth 11a and the gear teeth 12a.

It is herein noted that: the term "engagement direction P1" refers to a direction that brings the gear teeth 11a of the worm shaft 11 closer to the gear teeth 12a of the worm wheel 12; the term "disengagement direction P2" refers to a direction opposite the engagement direction P1; and the term "engagement direction axis P" refers to an axis along the engagement direction P1.

Figure 4:
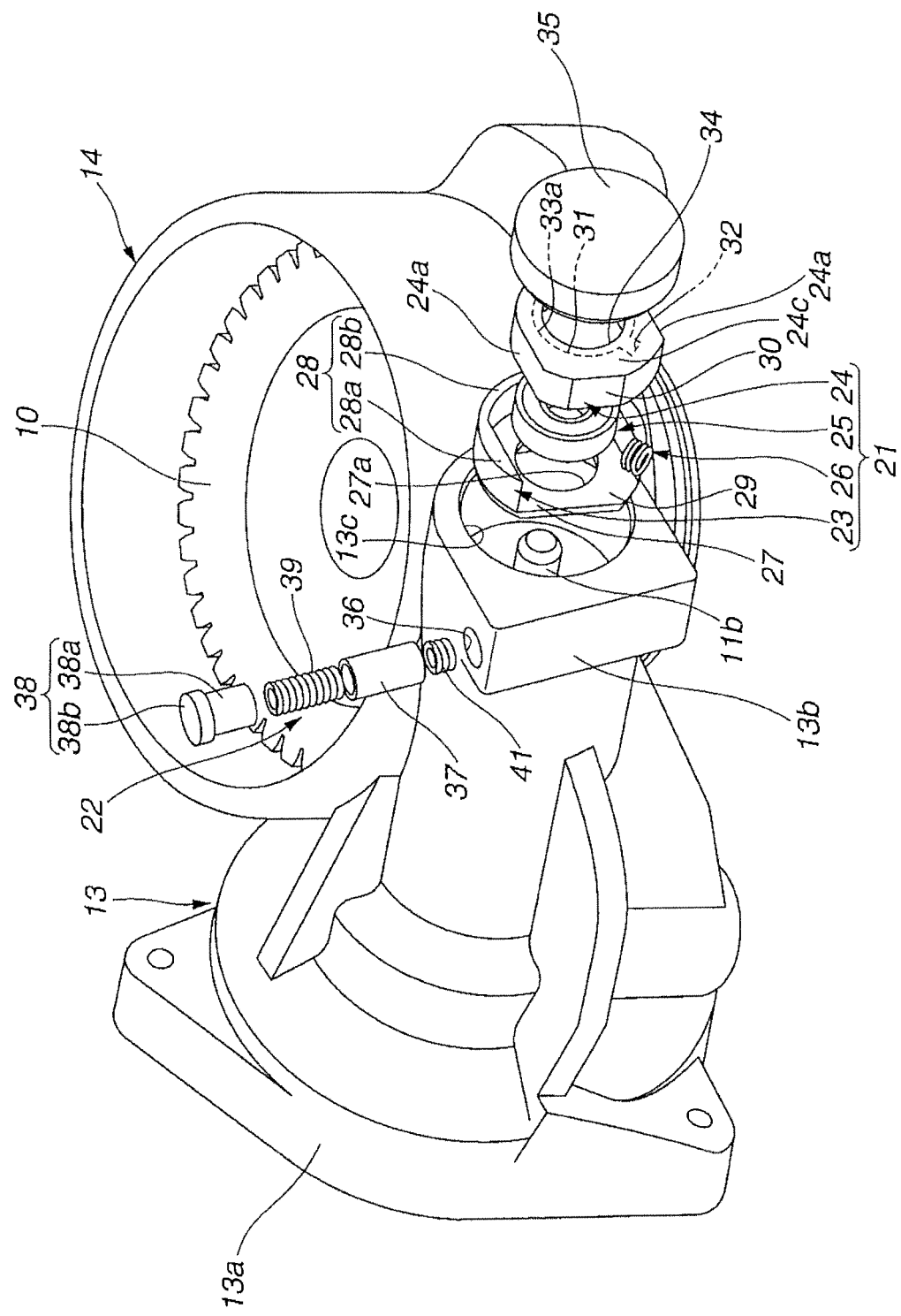
FIG. 4 is an exploded perspective view of the reduction gear mechanism and the backlash adjustment mechanism of the power steering apparatus according to the first embodiment of the present invention.
Figure 5:
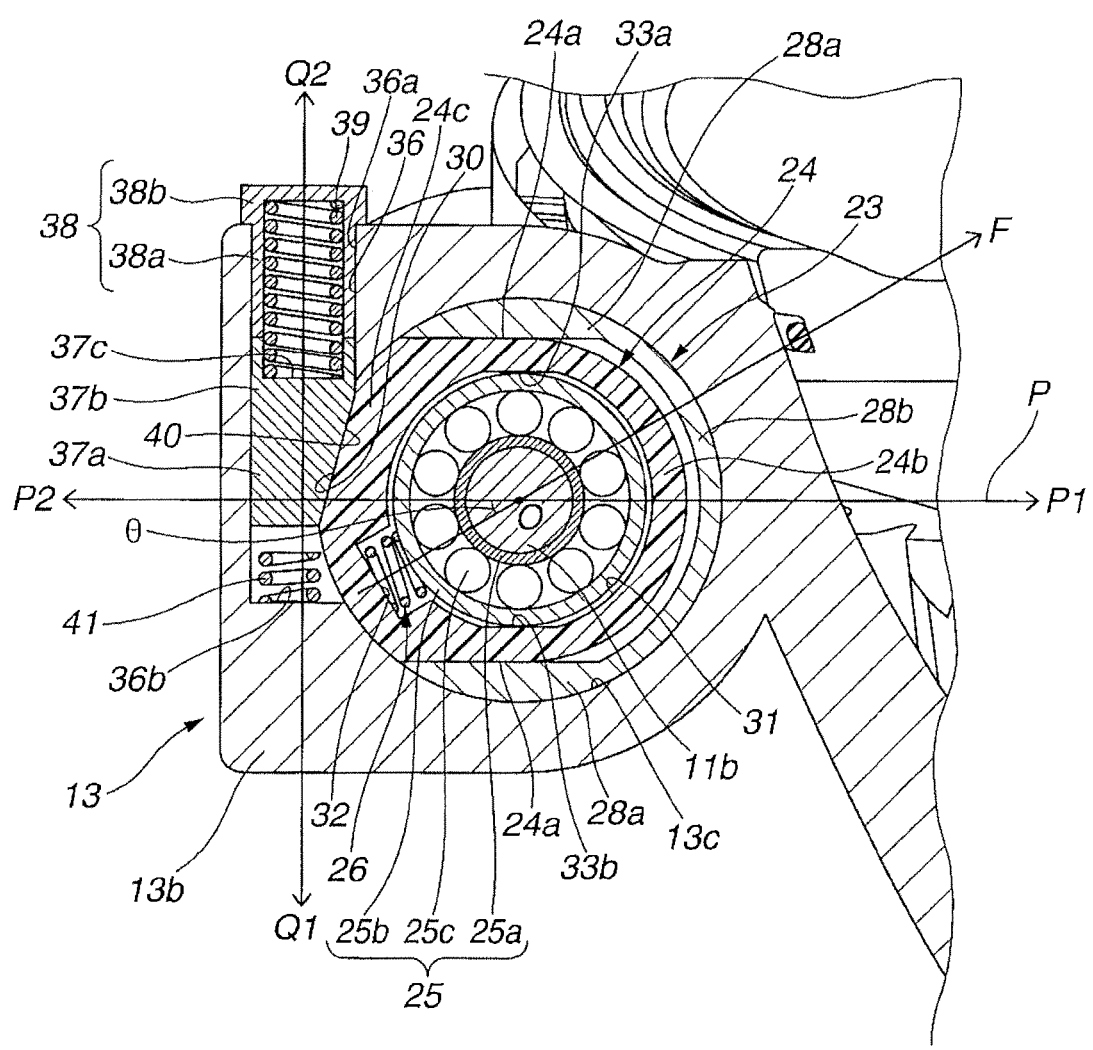
FIG. 5 is a section view taken along line A-A of FIG. 2.

In the first embodiment, the backlash adjustment mechanism includes a bearing unit 21 that directly biases the worm shaft 11 toward the worm wheel 12 and a slider unit 22 that indirectly biases the worm shaft 11 toward the worm wheel 12 as shown in FIGS. 4 and 5.

As shown in FIGS. 4 to 6, the bearing unit 21 has an outer holder 23 press-fitted in an opening 13c of the end portion 13b of the shaft accommodation part 13, an inner holder 24 (as a holder member) radially movably disposed in the outer holder 23, a ball bearing 25 radially movably disposed in the inner holder 24 and rotatably supporting the worm shaft 11 and a first coil spring 26 (as a spring member) elastically arranged between the ball bearing 25 and the worm shaft 11 to let the ball bearing 25 bias the worm shaft 11 toward the worm wheel 12.

The outer holder 23 is formed in a bottomed cylindrical shape, including a small-thickness disk-shaped cap portion 27, a substantially U-shaped circumferential wall portion 28 extending from a ball-bearing-side circumferential edge of the cap portion 27 and an accommodation room 29 defined by the cap portion 27 and the circumferential wall portion 28.

The cap portion 28 has, formed through substantially the center thereof, an insertion hole 27a through which an end portion 11b of the worm shaft 11 is inserted. A diameter of the insertion hole 27a is set relatively large as compared to an outer diameter of the end portion 11b of the worm shaft 11 whereby, even when the worm shaft 11 is caused to swing by the ball bearing 25 under the biasing force of the first coil spring 26, the worm shaft 11 does not come into contact with the insertion hole 27a.

The circumferential wall portion 28 has a pair of width across flat side walls 28a and 28a facing each other, with respective inner surfaces thereof aligned in parallel with the engagement direction axis P, and a circular arc wall 28b connecting ends of the side walls 28a and 28a.

As an opening is formed in a part of the outer holder 23 opposite from the circular arc wall 28b, the accommodation room 29 is formed in a U-shape with one end thereof open.

The inner holder 24 is integrally formed of a synthetic resin material in a bottomed cylindrical shape such that an outer circumferential profile of the inner holder 24 corresponds to an inner circumferential profile of the accommodation room 29 of the outer holder 23. Namely, the inner holder 24 includes a pair of width across flat side walls 24a and 24a corresponding to the side walls 28a and 28a of the outer holder 23, with respective outer surfaces thereof aligned in parallel with the engagement direction axis P, and a circular arc wall 24b corresponding to the circular arc wall 28b of the outer holder 23. The inner holder 24 can thus move in the outer holder 23 along the engagement direction axis P by sliding contact of the outer surfaces of the side walls 24a and 24a of the inner holder 24 with the inner surfaces of the side walls 28a and 28a of the outer holder 23. The inner holder 24 further includes a large-thickness portion 24c opposite from the circular arc wall 24b.

As shown in FIG. 6, the large-thickness portion 24c of the inner holder 24 protrudes in the disengagement direction P2 through the opening of the outer holder 23.

A first sliding surface 30 is formed on an exposed outer circumferential part of the large-thickness portion 24c of the inner holder 24 so as to receive a biasing force from the slider unit 22. As shown in FIG. 5, the first sliding surface 30 is inclined in a flat (linear) shape such that the closer to the engagement direction axis P, the farther from an axis O of the worm shaft 11, for sliding contact with the slider unit 22.

A bearing accommodation groove 31 (as a bearing accommodation part) is formed in the inner holder 24 at a position slightly deviated from the center of the inner holder 24 in the engagement direction P1. This bearing accommodation groove 31 is axially recessed in a concave shape from a cap-portion-side end face of the inner holder 24. A depth (axial dimension) of the bearing accommodation groove 31 is set substantially equal to an axial dimension of the ball bearing 25; and a diameter (radial dimension) of the bearing accommodation groove 31 is set larger than an outer diameter of the ball bearing 25.

The ball bearing 25 is entirely accommodated in the bearing accommodation groove 31 of the inner holder 24. As shown in FIG. 5, the ball bearing 25 has an inner race 25a mounted to an outer circumferential surface of the end portion 11b of the worm shaft 11, an outer race 25b arranged around an outer circumferential surface of the inner race 25a and a plurality of balls 25c interposed between the inner race 25a and the outer race 25b.

As shown in FIGS. 4 to 6, a pair of width across flat bearing guide surfaces 33a and 33b are formed in the bearing accommodation groove 31 so as to face each other and extend in parallel with the engagement direction axis P along the side walls 28a and 28a of the outer holder 23. A distance between the bearing guide surfaces 33a and 33b is set substantially equal to a diameter of the outer race 25b as shown in FIG. 5 whereby the ball bearing 25 is guided by the bearing guide surfaces 33a and 33b to move along the engagement direction axis P within the bearing accommodation groove 31.

Further, a spring accommodation room 32 (as a spring accommodation part) is formed in the large-thickness portion 24 of the inner holder 24 as shown in FIGS. 4 to 6. This spring accommodation room 32 is recessed from an inner circumferential surface of the bearing accommodation groove 31 and located at a position that does not overlap the first sliding surface 30, i.e., at a position offset from the first sliding surface 30 in a circumferential direction of the worm shaft 11.

The first coil spring 26 is accommodated in the spring accommodation room 32, with one end thereof elastically brought into contact with a bottom surface of the spring accommodation room 32 and the other end thereof elastically brought into contact with an outer circumferential surface of the outer race 25b of the ball bearing 25. By the elastic force (restoring force) of the first coil spring 26, the ball bearing 25 is diagonally biased in the engagement direction P1.

As specifically shown in FIG. 5, the large-thickness portion 24 of the inner holder 24 has a relatively thin region (as a first region) and a relatively thick region (as a second region) circumferentially offset from and larger in radial dimension than the relatively thin region with respect to the rotation axis of the worm shaft 11. The first sliding surface 30 is formed on the relatively thin region, whereas the spring accommodation room 32 is formed in the relatively thick region. In other words, the first coil spring 26 is situated on one circumferential side with respect to the first sliding surface 30. Thus, an angle θ between the engagement direction axis P and the biasing direction of the first spring coil 26 in the spring accommodation room 32 is set to an acute angle (θ<45°).

A bottom wall 31a of the bearing accommodation groove 31 has, formed through substantially the center thereof, a relatively large-diameter insertion hole 34 in which the worm shaft 11 is inserted as shown in FIGS. 4 and 6 as in the case of the insertion hole 27a of the cap portion 27 of the outer holder 23.

A disc-shaped plate 35 is press-fitted on an outer end portion of the bearing unit 21 adjacent to the opening 13c for sealing of the shaft accommodation part 13.

As shown in FIGS. 4 to 6, the slider unit 22 has a slider accommodation hole 36 (as a slider accommodation part) formed in a side wall of the shaft accommodation part 13, a slider 37 made of a metal material and movably accommodated in the slider accommodation hole 36, a retainer 38 press-fitted in and closing an opening end of the slider accommodation hole 36 and a second coil spring 39 (as a biasing member) elastically arranged between the slider 37 and the retainer 38 to let the slider 37 bias the worm shaft 11 toward the worm wheel 12 through the bearing unit 21. It is herein noted that, among the movement direction of the slider 37 in the slider accommodation hole 36, the term "forward direction Q1" refers to a direction that biases the slider 37 toward the lower side of FIG. 5 by the second coil spring 39; and the term "backward direction Q2" refers to a direction opposite the forward direction Q1.

The slider accommodation hole 36 is cylindrical in shape (circular arc in cross section) in a direction substantially perpendicular to a rotation axis of the worm shaft 11 and is displaced in position in the disengagement direction P2 relative to the opening 13c of the shaft accommodation part 13. As shown in FIG. 5, the slider accommodation hole 36 is in communication with the opening 13c of the shaft accommodation part 13 such that the biasing force is transmitted from the slider 37 to the inner holder 24 through the communication part between the slider accommodation hole 36 and the opening 13c.

The slider 37 is formed into a cylindrical column shape substantially similar to the slider accommodation hole 36. Namely, the cross-sectional profile of the outer circumferential profile of the slider 37 is circular arc-shaped corresponding to the circular cross-sectional profile of the inner circumferential surface of the slider accommodation hole 36.

A second sliding surface 40 is formed on an outer circumferential part of the slider 37 for sliding contact with the first sliding surface 30 of the inner holder 24. As shown in FIG. 5, the second sliding surface 40 is made flat (linear) by linearly cutting the slider 37 and is inclined with respect to the movement direction of the slider 37 such that a cross-sectional profile of the slider 37 changes from a circular shape to a semi-circular shape as directed from a backward end portion 37b to a forward end portion 37a of the slider 37. Further, an inclination angle of the second sliding surface 40 is set substantially the same as that of the first sliding surface 30. The slider 37 can thus move in the forward direction Q1 to bias the inner holder 24 in the engagement direction P1 by sliding contact of the second sliding surface 40 with the first sliding surface 30. A length of the second sliding surface 40 in the axial direction of the slider 37 is set longer than a length of the first sliding surface 30 in the axial direction of the slider 37 whereby almost the whole of the first sliding surface 30 is in contact with the second sliding surface 40 at any positional relationship of the first and second sliding surfaces 30 and 40.

The retainer 38 includes a cylindrical portion 38a corresponding in shape to an inner circumferential surface of the slider accommodation hole 36 and a large-diameter disc-shaped head portion 38b formed on and closing an opening end of the cylindrical portion 38a in the backward direction Q2 as shown in FIGS. 2 to 5.

A spring accommodation recess 37c is formed in the backward end portion 37h of the slider 37.

The second coil spring 39 is accommodated in the cylindrical portion 38a of the retainer 38, with one end thereof elastically brought into contact with an inner bottom surface of the head portion 38b and the other end portion elastically brought into contact with a bottom surface of the spring accommodation recess 37c. By the elastic force of the second coil spring 29, the slider 37 is biased in the forward direction Q1. A spring constant of the second coil spring 39 in the slider unit 22 is set smaller than that of the first coil spring 26 in the bearing unit 21.

As shown in FIGS. 4 and 5, a coil spring 41 (as a restriction spring member) is elastically arranged on a bottom surface 36b of the slider accommodation hole 36 so as to restrict excessive sliding movement of the slider 37 in the forward direction Q1. A spring constant of the coil spring 41 is set smaller than that the second coil spring 39 whereby, when the slider 37 moves by a predetermined distance in the forward direction Q1, the coil spring 41 comes into contact with the front end of the slider 37 and biases the slider 37 in the backward direction Q2.

[Operations/Effects of First Embodiment]

In the above-structured backlash adjustment mechanism, the engagement distance between the gear teeth 11a of the worm shaft 11 and the gear teeth 12a of the worm wheel 12 is close in a state that there is no wearing of the worm wheel 12 as shown in FIG. 6 (e.g. immediately after mounting of the power steering apparatus to the vehicle). In this state, the first coil spring 36 is held in a compressed position and exerts a large elastic force (restoring force) on the worm shaft 11 in the engagement direction P1. By such a large biasing force, the worm gear 11 is biased toward the worm wheel 12 to reduce the backlash between the gear teeth 11a and 12a in the worm gear 10.

There is conventionally a problem that, in the case where the engagement distance between the gear teeth 11a and the gear teeth 12a increases with wearing of the resinous worm wheel 12, the first coil spring 36 becomes stretched to force the worm shaft 11 in the engagement direction P1 and thereby decreases in its biasing force so that it may not be possible to stably reduce the backlash between the gear teeth 11a and the gear teeth 12a.

In the first embodiment, by contrast, the slider 37 moves in the forward direction Q1 under the biasing force of the second coil spring 39 when there occurs even a slight decrease in the biasing force of the first coil spring 26 due to increase in the engagement distance between the gear teeth 11a and the gear teeth 12a with wearing of the worm wheel 12. By this sliding movement, the second sliding surface 40 of the slider 37 and the first sliding surface 30 of the inner holder 24 slide relative to each other to bias the inner holder 24 in the engagement direction P1. At this time, the adjustment of the backlash between the gear teeth 11a and 12a has been completed by the action of the first coil spring 26 as mentioned above. The worm shaft 11 and the ball bearing 25 remain without moving in the inner holder 24 even though the inner holder 24 moves in the engagement direction P1 under the biasing force of the second coil spring 39. The first coil spring 26, which is elastically held between the inner holder 24 and the ball bearing 25, becomes compressed with such movement of the inner holder 24. Thus, the elastic force of the first coil spring 26 can be complemented and prevented from decreasing.

It is therefore possible in the first embodiment to continuously and stably adjust the backlash between the gear teeth 11a and the gear teeth 12a and prevent transmission performance deterioration of the worm gear 10, occurrence of gear teeth hitting noise in the worm gear 10 and the like over a long period of time.

Only for the purpose of biasing the inner holder 24 in the engagement direction P1, the slider 37 could be mounted in any orientation. For example, it is conceivable to mount the slider 37 in parallel with the rotation axis of the worm shaft 11 by forming the sliding surfaces 30 and 40 in an inclined shape along the rotation axis of the worm shaft 11. This however results in an increase of dead space due to arrangement of the long sliding unit 22 relative to the axially short ball bearing 25 so that the power sliding apparatus increases in size and deteriorates in vehicle mountability.

In the first embodiment, the dimension of the backlash adjustment mechanism does not become long in the axial direction of the ball bearing 25 as all of the movable components, such as slider 37 and inner holder 24, in the backlash adjustment mechanism are arranged to move in a plane substantially perpendicular to the worm shaft 11. It is thus possible to prevent an increase of dead space and achieve downsizing and mountability improvement of the power steering apparatus.

Further, the slider 37 is arranged to move linearly in a plane substantially perpendicular to the worm shaft 11 in the first embodiment. It is thus possible to simplify the structure of the shaft accommodation part 13 etc. in which the slider 37 and the slider accommodation hole 36 are provided.

As the backlash adjustment mechanism is so structured as to allow not only linear sliding movement of the slider 37 in a plane substantially perpendicular to the worm shaft 11 but also linear inclination of the sliding surfaces 30 and 40, the sliding amount (stroke amount) of the slider 37 is in proportion to the magnitude of the biasing force exerted on the worm shaft 11. It is thus possible to easily adjust the biasing force by selection of the first and second coil springs 26 and 39.

In the first embodiment, the bearing guide surfaces 33a and 33b are formed on the inner circumferential surface of the bearing accommodation groove 31 of the inner holder 24. As the ball bearing 25 is guided by the guide surfaces 33a and 33b to move in the engagement direction P1, it is possible to improve the engagement accuracy of the worm gear 10.

Furthermore, the first coil spring 26 is arranged such that the angle θ between the engagement direction axis P and the biasing direction of the first spring coil 26 in the spring accommodation room 32 is set to an acute angle in the first embodiment. This allows most of the biasing force (restoring force) of the first coil spring 26 to be exerted to bias the ball bearing 25 in the engagement direction P1 and, at the same time, allows a component of the biasing force to act in a direction perpendicular to the engagement direction P1 and thereby press the ball bearing 25 against the bearing guide surface 33a. It is thus possible to efficiently bias the ball bearing 25, effectively prevent rattling of the ball bearing 25 and further improve the engagement accuracy of the worm gear 10.

In the first embodiment, the cross-sectional profile of the inner circumferential surface of the slider accommodation hole 36 in the direction perpendicular to the movement direction of the slider 37 is circular. It is thus possible to easily form the slider accommodation hole 36 by e.g. drilling.

In addition, the cross-sectional profile of the outer circumferential profile of the slider 37 is circular arc-shaped so as to correspond to the circular cross-sectional profile of the inner circumferential surface of the slider accommodation hole 36. As the slider 37 is guided to move in the slider accommodation hole 36 by contact of the inner circumferential surface of the slider accommodation hole 36 and the outer circumferential surface of the slider 37, it is possible to effectively prevent rattling of the slider 37.

As the spring accommodation recess 37c is formed in the backward end portion 37b of the slider 37 so as to accommodate a part of the second coil spring 39, the length of the second coil spring 39 can be increased by a depth of the spring accommodation recess 37c. It is thus possible to restrict change of spring constant relative to change of compression/stretching stroke of the second coil spring 39 for easy adjustment of the biasing force.

In the first embodiment, the first sliding surface 30 is formed on the relatively thin region; and the first coil spring 26 is arranged in the relatively thick region among the large-thickness portion 24c of the inner holder 24. It is thus possible to achieve downsizing of the power steering apparatus by reduction of dead space.

It is possible to attain simplification of structure as well as reduction of production cost as the spring accommodation room 32 in which the first coil spring 26 is accommodated is formed integrally by resin molding of the inner holder 24 in the first embodiment.

As the length of the second sliding surface 40 in the axial direction of the slider 37 is set longer than the length of the first sliding surface 30 in the axial direction of the slider 37, almost the whole of the first sliding surface 30 is always in contact with the second sliding surface 40 at any positional relationship of the first and second sliding surfaces 30 and 40. It is thus possible that the first sliding surface 30 can secure a wide pressure receiving surface area to stably receive the biasing force from the slider 37.

In the first embodiment, the inner holder 24 and the slider 37 are made of different kinds of materials. It is thus possible to effectively prevent wearing and adhesion of the inner holder 24 and the slider 37 in comparison to the case where the inner holder 24 and the slider 37 are made of the same material. In particular, the inner holder 24 is made of resin; and the slider 37 is made of metal in the first embodiment. The use of such a resinous inner holder 24 is effective in preventing noise between the inner holder 24 and the metallic ball bearing 25.

In the first embodiment, the coil spring 41 is arranged on the bottom surface 36b of the slider accommodation hole 26 and set smaller in spring constant than the second coil spring 39. When the slider 37 moves by a predetermined amount in the forward direction Q1, the coil spring 41 exerts a biasing force on the slider 37 in the backward direction Q2. It is thus possible to restrict excessive forward sliding movement of the slider 37 and protect the worm wheel 12 from wear by excessive engagement of the gear teeth 11a and the gear teeth 12a.

Moreover, the spring constant of the second coil spring 39 is set smaller than that of the first coil spring 26 in the first embodiment. Even when there occurs a reverse input of force from the worm wheel 12 to the worm shaft 11 (i.e. input of force in the disengagement direction P2), the first coil spring 26 becomes deformed and compressed to absorb such a reverse input in advance of the second coil spring 39.

The influence of the reverse input on the second coil spring 39 can be reduced so as not to cause large movement of the slider 37 in the backward direction Q2. It is thus possible to bias the ball bearing 25 under the stable pressure and restrict variation of the biasing force against the worm shaft 11.

[Second Embodiment]

Figure 7:
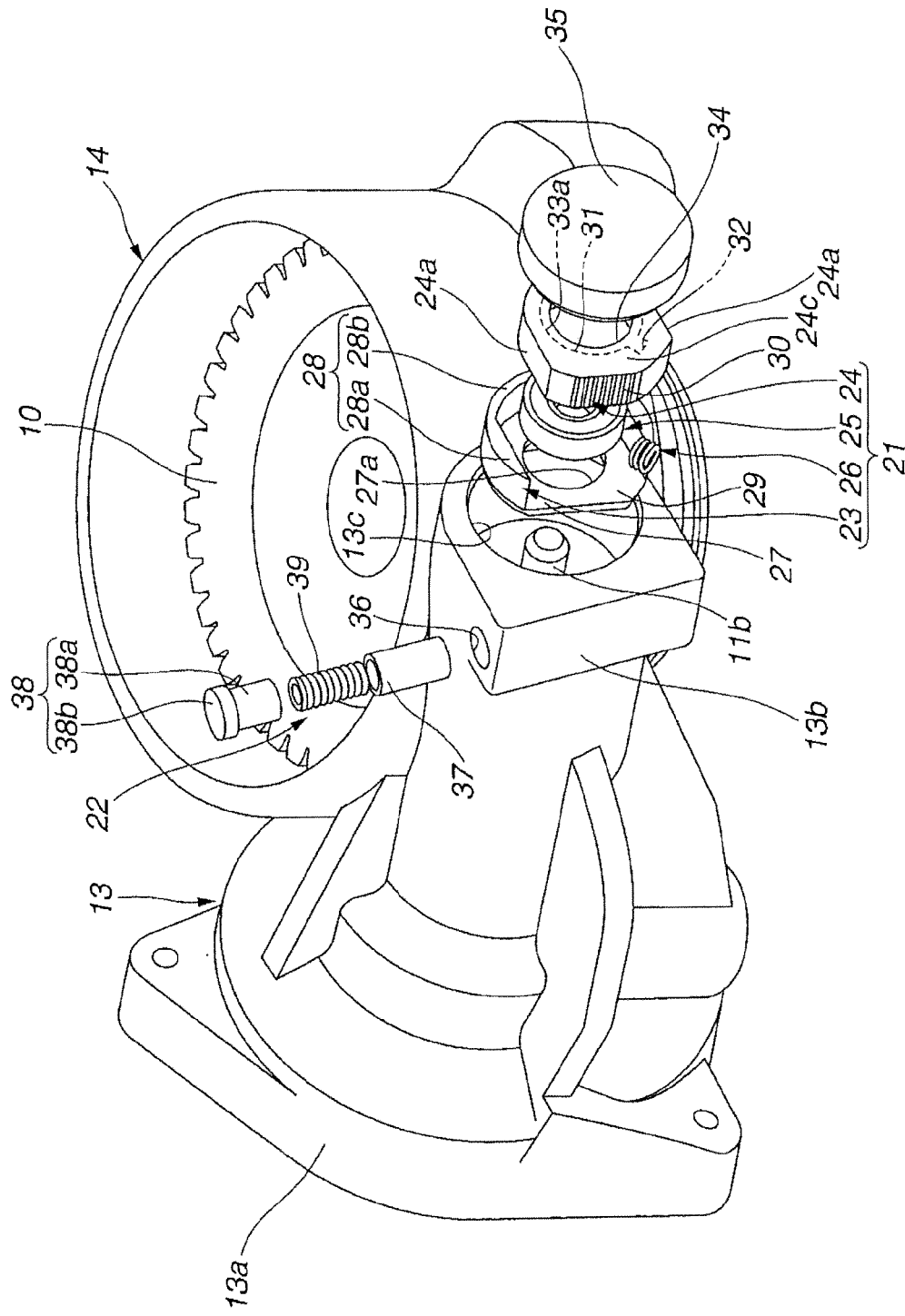
FIG. 7 is an exploded perspective view of a reduction gear mechanism and a backlash adjustment mechanism of a power steering apparatus according to a second embodiment of the present invention.

The power steering apparatus of the second embodiment is structurally similar to that of the first embodiment as shown in FIG. 7, except for the shapes of the first and second sliding surfaces 30 and 40.

Figure 8:
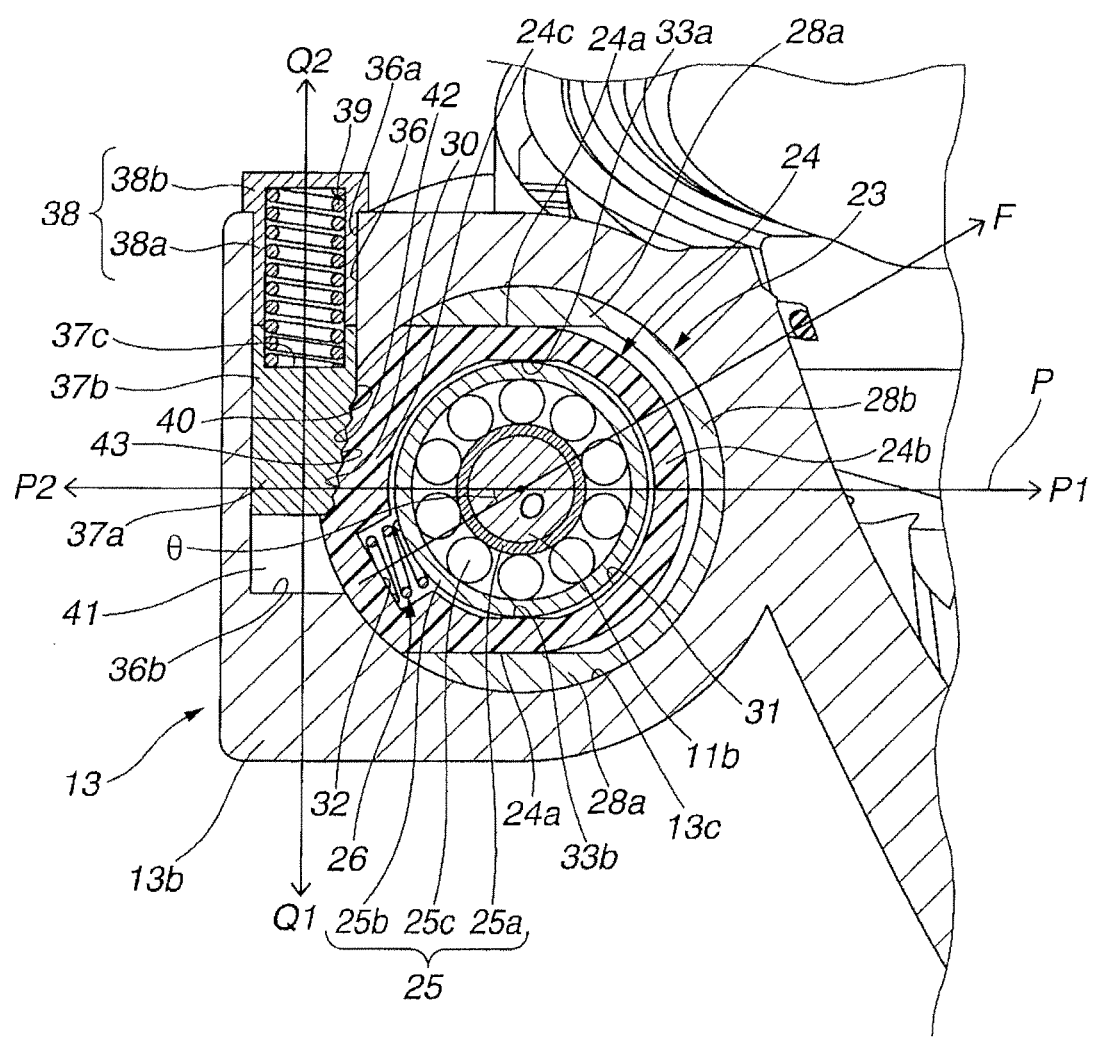
FIG. 8 is a transverse sectional view of main part of the backlash adjustment mechanism of the power steering apparatus according to the second embodiment of the present invention.

More specifically, the first and second sliding surfaces 30 and 40 are stepped (e.g. notched) in shape as shown in FIG. 8 in the second embodiment.

The first sliding surface 30 has a plurality of first contact regions 42 aligned substantially in parallel with the movement direction of the slider 37 and a plurality of step regions connecting the first contact regions 42. By these regions, the first sliding surface 30 is inclined in a stepwise shape with respect to the movement direction of the slider 37.

Similarly, the second sliding surface 40 has a plurality of second contact regions 43 aligned substantially in parallel and brought into engagement with the first contact regions 42 and a plurality of step regions connecting the second contact regions 43. By these regions, the second sliding surface 40 is inclined in a stepwise shape along the first sliding surface 30.

By engagement of the first sliding surface 30 and the second sliding surface 40, the slider 37 is prevented from moving in the backward direction Q2 but is allowed to move in the forward direction Q1.

In the second embodiment, both of the first and second sliding surfaces 30 and 40 are subjected in advance to surface treatment so as to prevent adhesion of the sliding surfaces 30 and 40. For example, the first sliding surface 30, which is made of resin, is subjected to fluorine treatment; and the second sliding surface 40, which is made of metal, is subjected to cutting treatment. As the friction coefficients of the sliding surfaces 30 and 40 are lowered by these surface treatments, there is unlikely to occur adhesion by friction between the sliding surfaces 30 and 40. At this time, it is preferable to set the friction coefficients of the sliding surfaces 30 and 40 to a lower level than that of the material of the slider 37.

It is therefore possible in the second embodiment to, even when there occurs a reverse input of force from the worm wheel 12 to the worm shaft 11 (i.e. input of force in the disengagement direction P2), assuredly prevent sliding movement of the slider 37 in the backward direction Q2 by engagement of the stepped sliding surfaces 30 and 40.

As the contact regions 42 and 43 of the sliding surfaces 30 and 40 are aligned perpendicular to the reverse input (i.e. perpendicular to the disengagement direction P2), the reverse input can be received by the contact regions 42 and 43 and prevented from acting in the movement direction of the slider 37. It is thus possible to more assuredly restrict sliding movement of the slider 37 in the backward direction Q2.

It is further possible to continuously and stably adjust the backlash between the gear teeth 11a and the gear teeth 12a without deterioration in the operability of the slider 37 as the adhesion of the sliding surfaces 30 and 40 can be prevented by the surface treatments.

Although not shown in the drawings, it is also feasible in the second embodiment to restrict excessive sliding movement of the slider 37 in the forward direction Q1 by arrangement of the coil spring 41.

[Third Embodiment]

The power steering apparatus of the third embodiment is structurally similar to that of the first embodiment, except for the structure and operation of the slider 37.

Figure 9:
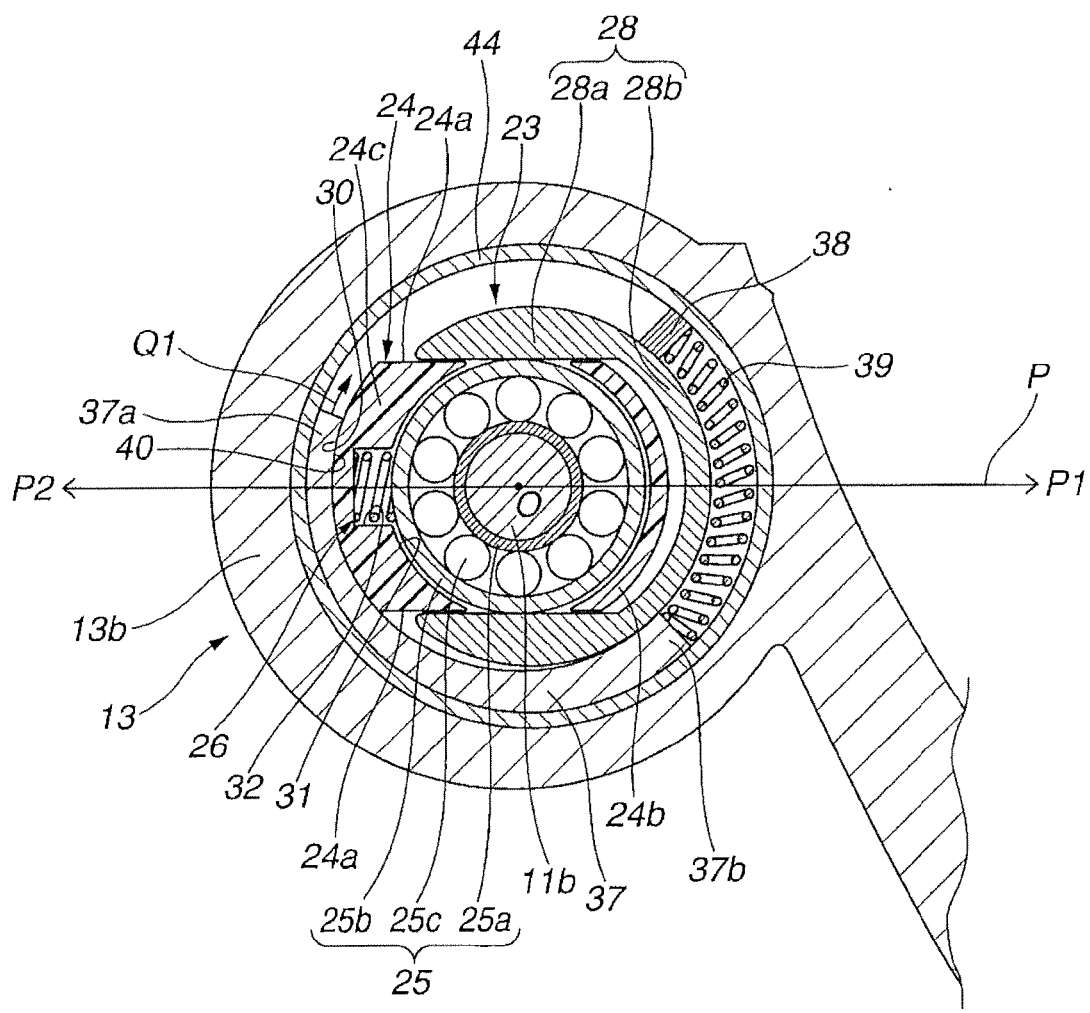
FIG. 9 is a transverse sectional view of main part of a backlash adjustment mechanism of a power steering apparatus according to a third embodiment of the present invention.
Figure 10:
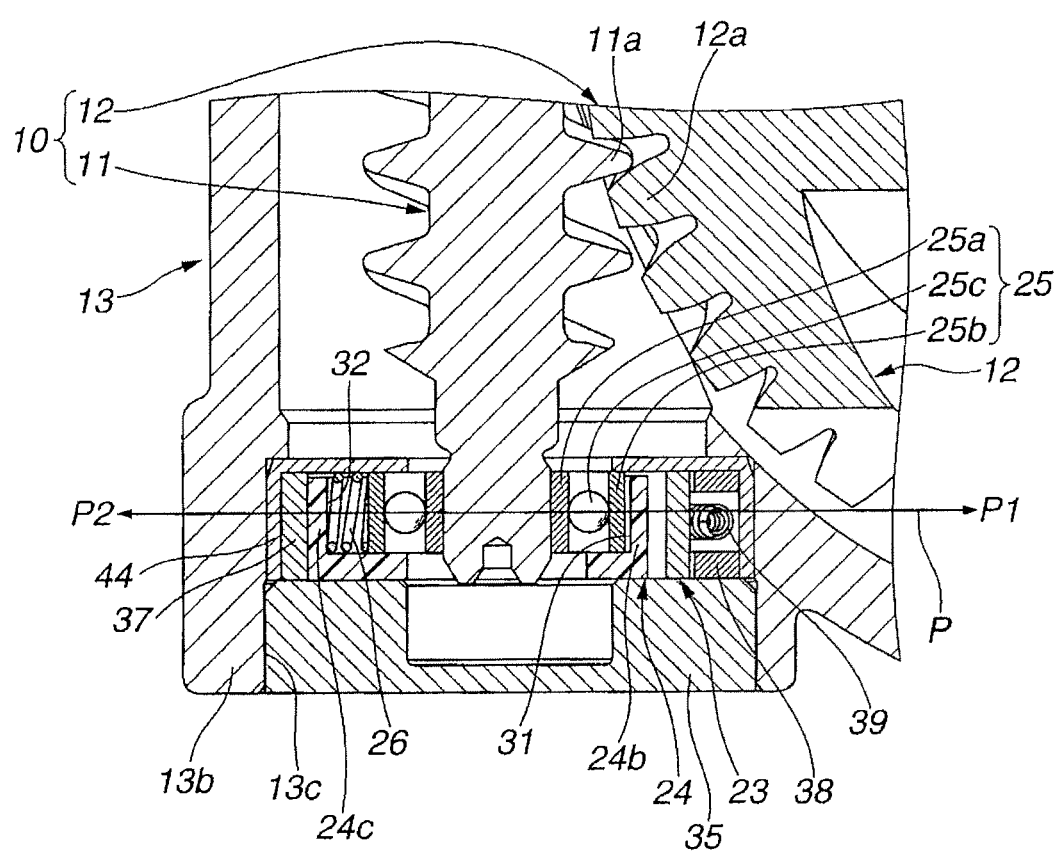
FIG. 10 is a longitudinal sectional view of main part of the backlash adjustment mechanism of the power steering apparatus according to the third embodiment of the present invention.

More specifically, the slider 37 is arranged to move circumferentially about the rotation axis of the worm shaft 11, rather than to move linearly, as shown in FIGS. 9 and 10 in the third embodiment.

The backlash adjustment mechanism further includes a bottomed cylindrical casing 44 press-fitted in the opening 13c of the shaft accommodation part 13.

The slider unit 22 is disposed between the bearing unit 21 and the casing 44. In the sliding unit 22, the slider 39 is formed into a curved wedge shape along the circumferential direction of the worm shaft 11 such that the thickness of the slider 37 gradually decrease in the clockwise direction from the backward end portion 37a to the forward end portion 37b. Thus, an inner circumferential end surface of the slider 37 as a whole (facing the bearing unit 21) is inclined with respect to the circumferential direction of the worm shaft 11 and adapted as the second sliding surface 40.

The first sliding surface 30 is formed on the inner holder 24 in a curved shape along the circumferential direction of the worm shaft 11, rather than in a linear cut shape as in the first embodiment, so as to correspond in shape to the second sliding surface 40.

The retainer 38 is also formed in a curved shape, with a substantially U-shaped cross section, along the circumferential direction of the worm shaft 11 and is disposed between the bearing unit 21 and the casing 44.

The second coil spring 39 is arranged between the bearing unit 21 and the casing 44, with one end thereof elastically brought into contact with the inner bottom surface of the retainer 38 and the other end elastically brought into contact with the backward end portion 37b of the slider 37, as in the case of the first embodiment.

By the elastic force (restoring force) of the second coil spring 39, the slider 37 is biased at all times in the forward direction Q1 (i.e. clockwise direction of FIG. 9).

In the third embodiment, the slider 37 moves in the forward direction Q1 under the biasing force of the second coil spring 39 when there occurs a decrease in the biasing force of the first coil spring 26. By this sliding movement, the second sliding surface 40 of the slider 37 and the first sliding surface 30 of the inner holder 24 slide relative to each other to bias the inner holder 24 in the engagement direction P1. It is therefore possible in the third embodiment to obtain the same effects as in the first embodiment.

As the slider 37 is arranged to move circumferentially about the rotation axis of the worm shaft 11, the stroke amount of the slider 37 can be increased in the circumferential direction of the worm shaft 11. It is thus possible to achieve downsizing of the power steering apparatus in the radial direction of the worm shaft 11.

Further, the backlash adjustment mechanism can be provided as an assembly as all of the structural components of the backlash adjustment mechanism are accommodated in the casing 44. It is thus possible to obtain improvement in productivity.

As mentioned above, there is no need in the third embodiment to form the first sliding surface 30 by cutting as in the first embodiment. Accordingly, the first coil spring 26 and the spring accommodation room 32 in which the first coil spring 26 is accommodated are arranged along the engagement direction axis P; and the bearing guide surfaces 33a and 33b by which the ball bearing 25 is guided under the biasing force of the first coil spring 26 are no longer needed and are thus eliminated.

[Other Embodiments]

Although the present invention has been described with reference to the above exemplary embodiments, the present invention is not limited to these exemplary embodiments. Various modification and variation of the embodiments described above will occur to those skilled in the art in light of the above teachings.

In the above first and second embodiments, the first and second sliding surfaces 30 and 40 are formed into a linear inclined shape. The shape of the first and second sliding surfaces 30 and 40 are not however limited to such a linear inclined shape. The first and second sliding surfaces 30 and 40 can alternatively be formed in any shape, such as curved inclined shape, as long as these sliding surfaces 30 and 40 function to bias the inner holder 24 in the engagement direction P1 by relative sliding.

In the above first to third embodiments, the first coil spring 26 is interposed between the inner holder 24 and the ball bearing 25 such that the worm shaft 11 is biased by the first coil spring 26 to deepen the engagement of the gear teeth 11a of the worm shaft 11 and the gear teeth 12a of the worm wheel 12. It is alternatively feasible to eliminate the first coil spring 26 in the case where the worm shaft 11 and the worm wheel 12 are mounted with deep engagement of the gear teeth 11a and the gear teeth 12a. Namely, the backlash adjustment mechanism can be so structured that, when there occurs wearing of the worm wheel 12, the slider 37 moves in the forward direction Q1 to bias the inner holder 24 in the engagement direction P1 and thereby reduce the backlash between the gear teeth 11a and the gear teeth 12a.

In the case where the first coil spring 26 is eliminated, it is feasible eliminate the inner holder 24 and define the first sliding surface 25 on an outer circumference of the outer race 25b of the ball bearing 25 by forming the outer race 25b of the ball bearing 25 in substantially the same shape as the inner holder 24.

In the above first to third embodiments, the inner holder 24 is made of resin; and the slider 37 is made of metal. Alternatively, the inner holder 24 and the slider 37 may be made of the same kind of metal material. In this case, the difference in linear expansion coefficient between the inner holder 24 and the slider 37 becomes relatively small. It is thus possible to restrict a change of clearance caused due to such difference in linear expansion coefficient.

The entire contents of Japanese Patent Application No. 2014-182821 (filed on Sep. 9, 2014) are herein incorporated by reference.

The scope of the present invention is defined with reference to the following claims.

What is claimed is:

1. A power steering apparatus, comprising:
a steering mechanism that has a steering shaft connected to a steering wheel and transmits a steering force of the steering wheel to steerable wheels;
an electric motor that applies a rotational force as a steering assist force to the steering mechanism;
a reduction gear mechanism arranged between the steering mechanism and the electric motor and including: a worm gear that has a worm shaft coupled at one end portion thereof to the electric motor and a worm wheel engaged with the worm shaft and coupled to the steering mechanism and transmits the rotational force of the electric motor to the steering mechanism; and a gear housing that has a shaft accommodation part in which the worm shaft is accommodated and a wheel accommodation part in which the worm wheel is accommodated;
a ball bearing mounted to the other end portion of the worm shaft within the shaft accommodation part of the gear housing and having an inner race, an outer race and a plurality of balls to rotatably support the worm shaft;
a slider movable in a movement direction substantially perpendicular to a rotation axis of the worm shaft;
a holder member arranged in the gear housing and having a bearing accommodation part in which the ball bearing is accommodated;
a first sliding surface provided on an outer circumferential side of the holder member; and
a second sliding surface provided on the slider in an inclined shape with respect to the movement direction of the slider and brought in sliding contact with the first sliding surface such that forward movement of the slider in the movement direction causes relative sliding of the first and second sliding surfaces to bias the worm shaft in an engagement direction that brings the rotation axis of the worm shaft closer to a rotation axis of the worm wheel,
wherein the slider is arranged to move circumferentially about the rotation axis of the worm shaft.

2. The power steering apparatus according to claim 1, wherein the slider is arranged to move linearly.

3. The power steering apparatus according to claim 2, wherein the first sliding surface is provided in an inclined shape along the second sliding surface and has a plurality of step regions; and
wherein the second sliding surface has a plurality of step regions engaged with the respective step regions of the first sliding surface so as to allow forward movement of the slider in the movement direction but restrict backward movement of the slider in the movement direction.

4. The power steering apparatus according to claim 3, wherein the first sliding surface has a plurality of first contact regions aligned substantially in parallel with the movement direction of the slider; and
wherein the second sliding surface has a plurality of second contact regions aligned substantially in parallel with the first contact regions and brought into contact with the first contact regions, respectively.

5. The power steering apparatus according to claim 3, wherein the first and second sliding surfaces have been subjected to surface treatment such that each of the first and second sliding surfaces has a friction coefficient lower than that of a material of the slider.

6. The power steering apparatus according to claim 1, wherein the holder member is arranged on the other end portion of the worm shaft within the shaft accommodation part of the gear housing, and wherein the slider and the holder member are made of different kinds of materials.

7. The power steering apparatus according to claim 6, wherein the slider is made of a metal material; and
wherein the holder member is made of a resin material.

8. The power steering apparatus according to claim 1, wherein the holder member is arranged on the other end portion of the worm shaft within the shaft accommodation part of the gear housing, and wherein the slider and the holder member are made of metal materials.

9. The power steering apparatus according to claim 1, further comprising:
a first coil spring that biases the slider forward in the movement direction; and
a second coil spring that has a spring constant smaller than that of the first coil spring and, when the slider moves forward by a predetermined distance in the movement direction, applies a biasing force to bias the slider backward in the movement direction.

10. A power steering apparatus, comprising:
a steering mechanism that has a steering shaft connected to a steering wheel and transmits a steering force of the steering wheel to steerable wheels;
an electric motor that applies a rotational force as a steering assist force to the steering mechanism;
a reduction gear mechanism arranged between the steering mechanism and the electric motor and including: a worm gear that has a worm shaft coupled at one end portion thereof to the electric motor and a worm wheel engaged with the worm shaft and coupled to the steering mechanism and transmits the rotational force of the electric motor to the steering mechanism; and a gear housing that has a shaft accommodation part in which the worm shaft is accommodated and a wheel accommodation part in which the worm wheel is accommodated;
a ball bearing mounted to the other end portion of the worm shaft within the shaft accommodation part of the gear housing and having an inner race, an outer race and a plurality of balls to rotatably support the worm shaft;
a slider movable in a movement direction substantially perpendicular to a rotation axis of the worm shaft;
a holder member arranged on the other end portion of the worm shaft within the shaft accommodation part of the gear housing and having a bearing accommodation part in which the ball bearing is accommodated;
a first sliding surface provided on an outer circumferential side of the holder member;
a second sliding surface provided on the slider in an inclined shape with respect to the movement direction of the slider and brought in sliding contact with the first sliding surface such that forward movement of the slider in the movement direction causes relative sliding of the first and second sliding surfaces to bias the worm shaft in an engagement direction that brings the rotation axis of the worm shaft closer to a rotation axis of the worm wheel; and
a spring member arranged between the bearing accommodation part and the ball bearing to bias the ball bearing in the engagement direction,
wherein, when the worm shaft moves in a direction opposite the engagement direction, the spring member is deformed by an amount larger than an amount of movement of the slider.

11. A backlash adjustment mechanism for a power steering apparatus, the power steering apparatus comprising: a steering mechanism that transmits a steering force of a steering wheel to steerable wheels; an electric motor that applies a rotational force as a steering assist force to the steering mechanism; and a worm gear that has a worm shaft and a worm wheel accommodated in a gear housing and transmits the rotational force of the electric motor to the steering mechanism, the backlash adjustment mechanism being adapted to reduce backlash between the worm shaft and the worm wheel and comprising:
a ball bearing having an inner race, an outer race and a plurality of balls to rotatably support the worm shaft;
a holder member arranged in the gear housing and having a bearing accommodation part in which the ball bearing is accommodated;
a slider movable in a movement direction substantially perpendicular to a rotation axis of the worm shaft;
a first sliding surface provided on an outer circumferential side of the holder member; and
a second sliding surface provided on the slider in an inclined shape with respect to the movement direction of the slider and brought in sliding contact with the first sliding surface such that forward movement of the slider in the movement direction causes relative sliding of the first and second sliding surfaces to bias the worm shaft in an engagement direction that brings the rotation axis of the worm shaft closer to a rotation axis of the worm wheel.

12. The backlash adjustment mechanism according to claim 11,
wherein the slider is arranged to move linearly.

13. A power steering apparatus, comprising:
a steering mechanism that has a steering shaft connected to a steering wheel and transmits a steering force of the steering wheel to steerable wheels;
an electric motor that applies a rotational force as a steering assist force to the steering mechanism;
a reduction gear mechanism arranged between the steering mechanism and the electric motor and including: a worm gear that has a worm shaft coupled at one end portion thereof to the electric motor and a worm wheel engaged with the worm shaft and coupled to the steering mechanism and transmits the rotational force of the electric motor to the steering mechanism; and a gear housing that has a shaft accommodation part in which the worm shaft is accommodated and a wheel accommodation part in which the worm wheel is accommodated:
a ball bearing mounted to the other end portion of the worm shaft within the shaft accommodation part of the gear housing and having an inner race, an outer race and a plurality of balls to rotatably support the worm shaft;
a slider movable in a movement direction substantially perpendicular to a rotation axis of the worm shaft;
a holder member arranged in the gear housing and having a bearing accommodation part in which the ball bearing is accommodated;
a first sliding surface provided on an outer circumferential side of the holder member; and
a second sliding surface provided on the slider in an inclined shape with respect to the movement direction of the slider and brought in sliding contact with the first sliding surface such that forward movement of the slider in the movement direction causes relative sliding of the first and second sliding surfaces to bias the worm shaft in an engagement direction that brings the rotation axis of the worm shaft closer to a rotation axis of the worm wheel,
wherein the slider is arranged to move linearly;
wherein the gear housing has slider accommodation part in which the slider is moveably accommodated;
wherein an inner circumferential surface of the slider accommodation part has a substantially circular arc-shaped cross-sectional profile in a direction substantially perpendicular to the movement direction of the slider; and
wherein an outer circumferential surface of the slider has a substantially circular arc-shaped cross-sectional profile corresponding to that of the inner circumferential surface of the slider accommodation part.

14. The power steering apparatus according to claim 13, further comprising a biasing member that biases the slider forward in the movement direction, wherein the slider has a recess formed therein to accommodate a part of the biasing member.

15. A power steering apparatus, comprising:
a steering mechanism that has a steering shaft connected to a steering wheel and transmits a steering force of the steering wheel to steerable wheels;
an electric motor that applies a rotational force as a steering assist force to the steering mechanism;
a reduction gear mechanism arranged between the steering mechanism and the electric motor and including: a worm gear that has a worm shaft coupled at one end portion thereof to the electric motor and a worm wheel engaged with the worm shaft and coupled to the steering mechanism and transmits the rotational force of the electric motor to the steering mechanism; and a gear housing that has a shaft accommodation part in which the worm shaft is accommodated and a wheel accommodation part in which the worm wheel is accommodated:
a ball bearing mounted to the other end portion of the worm shaft within the shaft accommodation part of the gear housing and having an inner race, an outer race and a plurality of balls to rotatably support the worm shaft;
a slider movable in a movement direction substantially perpendicular to a rotation axis of the worm shaft;
a holder member arranged on the other end portion of the worm shaft within the shaft accommodation part of the gear housing and having a bearing accommodation part in which the ball bearing is accommodated;
a first sliding surface provided on an outer circumferential side of the holder member; and
a second sliding surface provided on the slider in an inclined shape with respect to the movement direction of the slider and brought in sliding contact with the first sliding surface such that forward movement of the slider in the movement direction causes relative sliding of the first and second sliding surfaces to bias the worm shaft in an engagement direction that brings the rotation axis of the worm shaft closer to a rotation axis of the worm wheel;

wherein the holder member has a pair of opposite guide surfaces formed on an inner circumference of the bearing accommodation part and aligned in parallel with the engagement direction so as to guide movement of the ball bearing in the engagement direction but restrict movement of the ball bearing in a direction perpendicular to the engagement direction.

16. The power steering apparatus according to claim 15, further comprising:
a spring member arranged between the bearing accommodation part and the ball bearing to exert a biasing force on the ball bearing such that an angle between an axis along the engagement direction and a direction of the biasing force of the spring member is set to an acute angle and such that a component of the biasing force of the spring member acts to press the ball bearing against one of the guide surfaces and bring the rotation axis of the worm shaft closer to the rotation axis of the worm wheel.

17. The power steering apparatus according to claim 16,
wherein the holder member has a first region and second region circumferentially offset from the first region and larger in radial dimension than the first region with respect to the rotation axis of the worm shaft;
wherein the first sliding surface is provided on the first region of the holder member; and
wherein the spring member is provided in the second region of the holder member.

18. The power steering apparatus according to claim 17,
wherein the holder member has, formed by molding, a recess in which the spring member is accommodated.

19. The power steering apparatus according to claim 15,
wherein the first sliding surface is substantially flat in shape such that the whole area of the first sliding surface is in contact with the second sliding surface in a direction of relative sliding of the first and second sliding surfaces.

* * * * *